(12) United States Patent
Morin

(10) Patent No.: US 11,997,425 B1
(45) Date of Patent: May 28, 2024

(54) SYSTEMS AND METHODS TO GENERATE CORRESPONDENCES BETWEEN PORTIONS OF RECORDED AUDIO CONTENT AND RECORDS OF A COLLABORATION ENVIRONMENT

(71) Applicant: Asana, Inc., San Francisco, CA (US)

(72) Inventor: Steve B Morin, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 0 days.

(21) Appl. No.: 17/674,391

(22) Filed: Feb. 17, 2022

(51) Int. Cl.
| | |
|---|---|
| *H04N 7/15* | (2006.01) |
| *G06Q 10/10* | (2023.01) |
| *H04L 12/18* | (2006.01) |
| *H04N 7/14* | (2006.01) |

(52) U.S. Cl.
CPC ......... *H04N 7/155* (2013.01); *H04L 12/1831* (2013.01); *H04N 7/147* (2013.01); *G06Q 10/103* (2013.01)

(58) Field of Classification Search
CPC .... H04N 7/147; H04N 7/155; H04L 12/1831; G06Q 10/10–1097; G06Q 10/101; G06Q 10/103; G06F 3/048
See application file for complete search history.

(56) References Cited

U.S. PATENT DOCUMENTS

| | | |
|---|---|---|
| 5,233,687 A | 8/1993 | Henderson, Jr. |
| 5,524,077 A | 6/1996 | Faaland |
| 5,530,861 A | 6/1996 | Diamant |
| 5,608,898 A | 3/1997 | Turpin |
| 5,611,076 A | 3/1997 | Durflinger |
| 5,623,404 A | 4/1997 | Collins |
| 5,721,770 A | 2/1998 | Kohler |
| 5,983,277 A | 11/1999 | Heile |
| 6,024,093 A | 2/2000 | Cron |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

Dawei Li, "Deepcham: Collaborative Edge-Mediated Adaptive Deep Learning for Mobile Object Recognition", 2016, IEEE/ACM, pp. 64-76. (Year: 2016).

(Continued)

*Primary Examiner* — Liang Y Li
(74) *Attorney, Agent, or Firm* — Esplin & Associates, PC

(57) ABSTRACT

Systems and methods to generate correspondences between portions of recorded content and records of a collaboration environment are described herein. Exemplary implementations may perform one or more of: manage environment state information maintaining a collaboration environment; effectuate presentation of instances of a user interface on client computing platform(s) associated with the users; obtain user input information conveying the user input into the instances of the user interface; generate, based on the user input information, correspondence information conveying user-provided correspondences between temporal content of recorded audio content and the one or more records; and/or other operations.

14 Claims, 5 Drawing Sheets

(56) References Cited

U.S. PATENT DOCUMENTS

| | | |
|---|---|---|
| 6,256,651 B1 | 7/2001 | Tuli |
| 6,292,830 B1 | 9/2001 | Taylor |
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 7,020,697 B1 | 3/2006 | Goodman |
| 7,039,596 B1 | 5/2006 | Lu |
| 7,086,062 B1 | 8/2006 | Faour |
| 7,213,051 B2 * | 5/2007 | Zhu .................... H04L 12/1831 709/248 |
| 7,349,920 B1 | 3/2008 | Feinberg |
| 7,418,482 B1 | 8/2008 | Lusher |
| 7,428,723 B2 | 9/2008 | Greene |
| 7,640,511 B1 | 12/2009 | Keel |
| 7,676,542 B2 | 3/2010 | Moser |
| 7,779,039 B2 | 8/2010 | Weissman |
| 7,805,327 B1 | 9/2010 | Schulz |
| RE41,848 E | 10/2010 | Daniell |
| 7,844,454 B2 | 11/2010 | Coles |
| 7,917,855 B1 | 3/2011 | Satish |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,627,199 B1 | 1/2014 | Handley |
| 8,639,552 B1 | 1/2014 | Chen |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,299,039 B1 | 3/2016 | Wang |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,171,256 B2 * | 1/2019 | Faulkner ............ H04L 12/1822 |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,657,501 B2 | 5/2020 | Choi |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,062,270 B2 * | 7/2021 | Hilleli .................... G06F 40/216 |
| 11,082,281 B2 | 8/2021 | Justin |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,144,854 B1 | 10/2021 | Mouawad |
| 11,159,470 B1 | 10/2021 | Botwick |
| 11,170,761 B2 | 11/2021 | Thomson |
| 11,204,683 B1 | 12/2021 | Sabo |
| 11,212,242 B2 | 12/2021 | Cameron |
| 11,263,228 B2 | 3/2022 | Koch |
| 11,287,946 B2 | 3/2022 | Jackson |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 11,496,711 B1 | 11/2022 | Cronan |
| 11,627,006 B1 | 4/2023 | Chew |
| 2002/0065798 A1 | 5/2002 | Bostleman |
| 2002/0082889 A1 | 6/2002 | Oliver |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0065722 A1 * | 4/2003 | Leperen .................. H04L 63/10 709/205 |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0210470 A1 | 10/2004 | Rusk |
| 2004/0230447 A1 | 11/2004 | Schwerin-Wenzel |
| 2004/0268451 A1 | 12/2004 | Robbin |
| 2005/0210394 A1 | 9/2005 | Crandall |
| 2005/0216111 A1 | 9/2005 | Ooshima |
| 2005/0222971 A1 | 10/2005 | Cary |
| 2006/0028917 A1 | 2/2006 | Wigginton |
| 2006/0030992 A1 | 2/2006 | Iwatsuki |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |

(56) References Cited

U.S. PATENT DOCUMENTS

| | | |
|---|---|---|
| 2006/0218551 A1 | 9/2006 | Berstis |
| 2006/0224430 A1 | 10/2006 | Butt |
| 2006/0277487 A1 | 12/2006 | Poulsen |
| 2007/0016465 A1 | 1/2007 | Schaad |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0018835 A1 | 1/2009 | Cooper |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0089225 A1 | 4/2009 | Baier |
| 2009/0089682 A1 | 4/2009 | Baier |
| 2009/0089701 A1 | 4/2009 | Baier |
| 2009/0094623 A1 | 4/2009 | Chakra |
| 2009/0100340 A1 | 4/2009 | Paek |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2010/0332236 A1 | 12/2010 | Tan |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035925 A1 | 2/2012 | Friend |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0318447 A1 | 11/2013 | Deluca |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0028826 A1 | 1/2014 | Lee |
| 2014/0036639 A1 | 2/2014 | Taber |
| 2014/0039962 A1 | 2/2014 | Nudd |
| 2014/0040780 A1 | 2/2014 | Brian |

(56) References Cited

U.S. PATENT DOCUMENTS

| | | |
|---|---|---|
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0218372 A1 | 8/2014 | Missig |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0088499 A1 | 3/2015 | White |
| 2015/0100503 A1 | 4/2015 | Lobo |
| 2015/0113540 A1 | 4/2015 | Rabinovici |
| 2015/0134393 A1 | 5/2015 | De |
| 2015/0149540 A1 | 5/2015 | Barker |
| 2015/0153906 A1 | 6/2015 | Liao |
| 2015/0154291 A1 | 6/2015 | Shepherd |
| 2015/0169069 A1 | 6/2015 | Lo |
| 2015/0181020 A1* | 6/2015 | Fitzsimmons .... H04M 3/42221 379/67.1 |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0027442 A1 | 1/2016 | Burton |
| 2016/0048408 A1 | 2/2016 | Madhu |
| 2016/0048786 A1 | 2/2016 | Fukuda |
| 2016/0048806 A1 | 2/2016 | Epson |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0162819 A1 | 6/2016 | Hakman |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2016/0344678 A1 | 11/2016 | MacDonald |
| 2017/0004213 A1 | 1/2017 | Cunico |
| 2017/0004586 A1 | 1/2017 | Suzuki |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0048285 A1 | 2/2017 | Pearl |
| 2017/0061341 A1 | 3/2017 | Haas |
| 2017/0068933 A1 | 3/2017 | Norton |
| 2017/0093874 A1 | 3/2017 | Uthe |
| 2017/0097929 A1 | 4/2017 | Cecchi |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0161258 A1* | 6/2017 | Astigarraga ......... G06F 16/951 |
| 2017/0177671 A1 | 6/2017 | Allgaier |
| 2017/0185592 A1 | 6/2017 | Frei |
| 2017/0192642 A1 | 7/2017 | Fishman |
| 2017/0193349 A1 | 7/2017 | Jothilingam |
| 2017/0206217 A1 | 7/2017 | Deshpande |
| 2017/0249577 A1 | 8/2017 | Nishikawa |
| 2017/0310716 A1 | 10/2017 | Lopez Venegas |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2017/0364866 A1 | 12/2017 | Steplyk |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0129995 A1 | 5/2018 | Fowler |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0211223 A1 | 7/2018 | Jacobson |
| 2018/0225618 A1 | 8/2018 | Shaouy |
| 2018/0225795 A1 | 8/2018 | Napoli |
| 2018/0247352 A1 | 8/2018 | Rogers |
| 2018/0247648 A1 | 8/2018 | Nadimpalli |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0341903 A1 | 11/2018 | Keen |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0050811 A1 | 2/2019 | Kang |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |

(56) References Cited

U.S. PATENT DOCUMENTS

| | | |
|---|---|---|
| 2019/0095846 A1 | 3/2019 | Gupta |
| 2019/0102700 A1 | 4/2019 | Babu |
| 2019/0108834 A1 | 4/2019 | Nelson |
| 2019/0130355 A1 | 5/2019 | Gupta |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0258704 A1 | 8/2019 | Mertens |
| 2019/0258985 A1 | 8/2019 | Daniek |
| 2019/0265821 A1 | 8/2019 | Pearl |
| 2019/0272902 A1* | 9/2019 | Vozila ............... G06N 20/00 |
| 2019/0295041 A1 | 9/2019 | Sim |
| 2019/0318321 A1 | 10/2019 | Lopez Venegas |
| 2019/0327103 A1 | 10/2019 | Niekrasz |
| 2019/0327362 A1 | 10/2019 | Herrin |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0362252 A1 | 11/2019 | Miller |
| 2019/0370320 A1 | 12/2019 | Kalra |
| 2020/0019907 A1 | 1/2020 | Notani |
| 2020/0052921 A1 | 2/2020 | Van Rensburg |
| 2020/0059539 A1 | 2/2020 | Wang |
| 2020/0065736 A1 | 2/2020 | Relangi |
| 2020/0074510 A1 | 3/2020 | Corodimas |
| 2020/0104802 A1 | 4/2020 | Kundu |
| 2020/0118568 A1 | 4/2020 | Kudurshian |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0242540 A1 | 7/2020 | Rosati |
| 2020/0244611 A1 | 7/2020 | Rosenstein |
| 2020/0293975 A1 | 9/2020 | Faulkner |
| 2020/0328906 A1 | 10/2020 | Raghavan |
| 2020/0344253 A1 | 10/2020 | Kurup |
| 2020/0349178 A1 | 11/2020 | Raju |
| 2020/0349415 A1 | 11/2020 | Raju |
| 2020/0349614 A1 | 11/2020 | Batcha |
| 2020/0396184 A1 | 12/2020 | Perazzo |
| 2020/0403818 A1 | 12/2020 | Daredia |
| 2021/0004380 A1 | 1/2021 | Koch |
| 2021/0004381 A1 | 1/2021 | Smith |
| 2021/0089860 A1 | 3/2021 | Heere |
| 2021/0097466 A1 | 4/2021 | Sabo |
| 2021/0097502 A1 | 4/2021 | Hilleli |
| 2021/0103451 A1 | 4/2021 | Sabo |
| 2021/0110347 A1 | 4/2021 | Khalil |
| 2021/0117479 A1 | 4/2021 | Liu |
| 2021/0133681 A1 | 5/2021 | Dhaliwal |
| 2021/0134289 A1 | 5/2021 | Ito |
| 2021/0134296 A1 | 5/2021 | Gabriela |
| 2021/0136012 A1 | 5/2021 | Barbitta |
| 2021/0182475 A1 | 6/2021 | Pelz |
| 2021/0201271 A1 | 7/2021 | Vukich |
| 2021/0209561 A1* | 7/2021 | Kishore ............. G06Q 10/1095 |
| 2021/0216562 A1 | 7/2021 | Smith |
| 2021/0232282 A1 | 7/2021 | Karpe |
| 2021/0280169 A1 | 9/2021 | Suzuki |
| 2021/0287673 A1 | 9/2021 | Kaplan |
| 2021/0319408 A1 | 10/2021 | Jorasch |
| 2021/0320811 A1* | 10/2021 | Constantinides .... G06Q 10/103 |
| 2021/0320891 A1 | 10/2021 | Rosenstein |
| 2021/0342786 A1 | 11/2021 | Jiang |
| 2021/0365862 A1 | 11/2021 | Doan |
| 2021/0366490 A1 | 11/2021 | Hsieh |
| 2021/0375289 A1 | 12/2021 | Zhu |
| 2021/0375291 A1 | 12/2021 | Zeng |
| 2021/0382734 A1 | 12/2021 | Rosenstein |
| 2022/0019320 A1 | 1/2022 | Sabo |
| 2022/0027834 A1 | 1/2022 | Zheng |
| 2022/0058548 A1 | 2/2022 | Garg |
| 2022/0058552 A1 | 2/2022 | Takahashi |
| 2022/0060345 A1 | 2/2022 | Wiener |
| 2022/0075792 A1 | 3/2022 | Koch |
| 2022/0078142 A1 | 3/2022 | Cameron |
| 2022/0158859 A1 | 5/2022 | Raghavan |
| 2022/0198403 A1* | 6/2022 | Chen .................. G10L 15/26 |
| 2022/0207489 A1 | 6/2022 | Gupta |
| 2022/0377279 A1* | 11/2022 | Cronan ............... H04L 12/1831 |
| 2023/0004727 A1 | 1/2023 | Oberoi |
| 2023/0029697 A1 | 2/2023 | Kruk |
| 2024/0028564 A1 | 1/2024 | Davies |
| 2024/0029027 A1 | 1/2024 | Morin |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Examiner Interview Summary dated Feb. 25, 2016", 3 pgs.

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. 14/584,850, Response filed Apr. 10, 2017 to Non Final Office Action dated Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018-Toggl https://toggl.com/blog/best-team-calendar-applications-for-2018 (Year: 2017).

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana, Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

(56) References Cited

OTHER PUBLICATIONS

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTVVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv30 (Year: 2017) (24 pages).

How to Asana, Planning with Asana calendar, youtube excerpt, Feb. 14, 2017 https://www.youtube.com/watch?v=w816KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, wikipedia, archives org, 6 pages, Feb. 11, 2020 http://web.archive.org/web/20200211082902/https://en.wikipedia.org/wiki/Macro_(computer_science) (Year: 2020).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

Www.asana.com (as retrieved from https://web.archive.org/web/20160101054536/https://asana.com/press and https://web.archive.org/web/20160101054527/https://asana.com/product) (Year: 2016) 15 pages.

Www.cogmotive.com/blog/author/alan Alan Byrne: "Creating a company Shared Calendar in Office 365"; pp. 1-17; Sep. 10, 2013.

Cabanillas, Cristina, Manuel Resinas, and Antonio Ruiz-Cortés. "A template-based approach for responsibility management in executable business processes." Enterprise information systems 12.5 (2018): 550-586. (Year: 2018).

Nanos, Antonios G., and Anne E. James. "A virtual meeting system for the new age." 2013 IEEE 10th International Conference on e-Business Engineering. IEEE, 2013. (Year: 2013).

Shi, Yang, et al. "Meetingvis: Visual narratives to assist in recalling meeting context and content." IEEE Transactions on Visualization and Computer Graphics 24.6 (2018): 1918-1929. (Year: 2018).

Sarikaya, Ruhi. "The technology behind personal digital assistants: An overview of the system architecture and key components." IEEE Signal Processing Magazine 34.1 (2017): 67-81. (Year: 2017).

\* cited by examiner

SYSTEMS AND METHODS TO GENERATE CORRESPONDENCES BETWEEN PORTIONS OF RECORDED AUDIO CONTENT AND RECORDS OF A COLLABORATION ENVIRONMENT

FIELD OF THE DISCLOSURE

The present disclosure relates to improvements within a technical field of operating a virtual collaboration environment, in particular, a user interface to generate correspondences between portions of recorded content and records of a collaboration environment.

BACKGROUND

Web-based collaboration environments, sometimes referred to as work management platforms, may enable users to assign projects, tasks, or other work assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based virtual collaboration environment poses many challenges. For example, operating the collaboration environment may require precise ways of creation, storage, management, and/or provision of information that makes up the collaboration environment. One or more ways that operators look to improve the operation of the collaboration environment may be in the way information is defined and stored in records that make up the virtual collaboration environment and/or in the user interfaces that present information and/or provide access to the records. For example, some records may be created by users from some reference material. After a recorded video or audio meeting or dictation, a user may generate one or more records that reflect the work to be done following the recording. A user tasked with completing and/or organizing work may often refer back to the recording in order to obtain context for work to be done and/or simply to refresh their memory. However, the recording may be too long and/or may include information that may not be relevant to the particular work they are participating in. For example, multiple items of work may be derived from a single recording. A user working on a single item of work may not have a need or desire to review or revisit an entirety of the recording, because searching through the recording to find a relevant part may be time consuming.

To address these and/or other problems, one or more implementations presented herein propose a technique to generate correspondences between portions of recorded content (audio and/or video content) and individual records. The recorded content may have been recorded asynchronously with respect to the generation of the correspondences. The recorded content may be referred to as "asynchronous audio and/or video." One or more records may be automatically generated based on the recorded content and/or generated by the users based on recorded content. Correspondences between portions of the recorded content (referred to as "temporal content") may be provided by the users through interaction with a specially configured user interface. The correspondences may be associated with individual records so that users accessing the records through one or more user interfaces of the collaboration environment may be able to quickly jump to the portion(s) of the recorded content that are relevant to the particular work they are participating in.

User-provided correspondences may be a robust and effective way to correlate records for work with portions of recorded content. For example, users may be able to quickly and effectively identify what points in time and/or periods in time within recorded content are relevant to their work, and what parts are not. Since a typical meeting between users may not always be linear in nature, it is otherwise difficult to determine what portions of recorded content are actually going to be helpful to users who are tasked with doing or organizing the follow-up work. For example, users may find it helpful to include portions of a recording that lead up to a part that specifically discusses work to be done, and/or portions that also lead away from the part that specifically discusses work to be done. This additional context within the recording may aid the user in completing and/or organizing the follow up work, especially when they find it helpful to refer back to the recording.

One or more aspects of the present disclosure include a system configured to generate correspondences between portions of recorded content and records of a collaboration environment. The system may include one or more hardware processors configured by machine-readable instructions and/or other components. Executing the machine-readable instructions may cause the one or more hardware processors to facilitate generating correspondences between portions of recorded content and records of a collaboration environment. The machine-readable instructions may include one or more computer program components. The one or more computer program components may include one or more of an environment state component, a user interface component, and/or other components.

The environment state component may be configured to manage environment state information maintaining a collaboration environment. The collaboration environment may be configured to facilitate interaction by users with the collaboration environment. The environment state information may include one or more records. The one or more records may include one or more of work unit records, project records, objective records, and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters characterizing the units of work. By way of non-limiting illustration, the work unit records may include one or more of a first work unit record for a first unit of work, a second work unit record for a second unit of work, and/or other records.

The user interface component may be configured to effectuate presentation of instances of a user interface on one or more client computing platforms associated with the users. The users may access recorded content and/or provide user input through the instances of the user interface to generate user-provided correspondences between temporal content of the recorded content and one or more records. The recorded content may include utterances by one or more users, other audio, visual content, and/or other content. The temporal content may correspond to points in time and/or periods of time within the recorded content. The user input may include identification of the temporal content within the recorded content. By way of non-limiting illustration, a first instance of the user interface may be presented on a first client computing platform associated with a first user through which the first user accesses first recorded audio content and provides a first set of user input. The first set of user input may include one or more of an identification of first temporal content within the first recorded audio content, an identification of second temporal content within the first recorded audio content, and/or other user input.

The environment state component may be configured to obtain user input information and/or other information. The user input information may convey the user input into the instances of the user interface. By way of non-limiting illustration, first user input information may convey the first set of user input into the first instance of the user interface.

The environment state component may be configured to generate, based on the user input information, correspondence information and/or other information. The correspondence information may convey user-provided correspondences between the temporal content of the recorded content and the one or more records. By way of non-limiting illustration, based on the first set of user input, first correspondence information and second correspondence information may be generated. The first correspondence information may convey a first correspondence between the first temporal content of the first recorded audio content and the first work unit record. The second correspondence information may convey a second correspondence between the second temporal content of the first recorded audio content and the second work unit record. The environment state component may be configured to store the correspondence information and/or other information in associated records of work.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
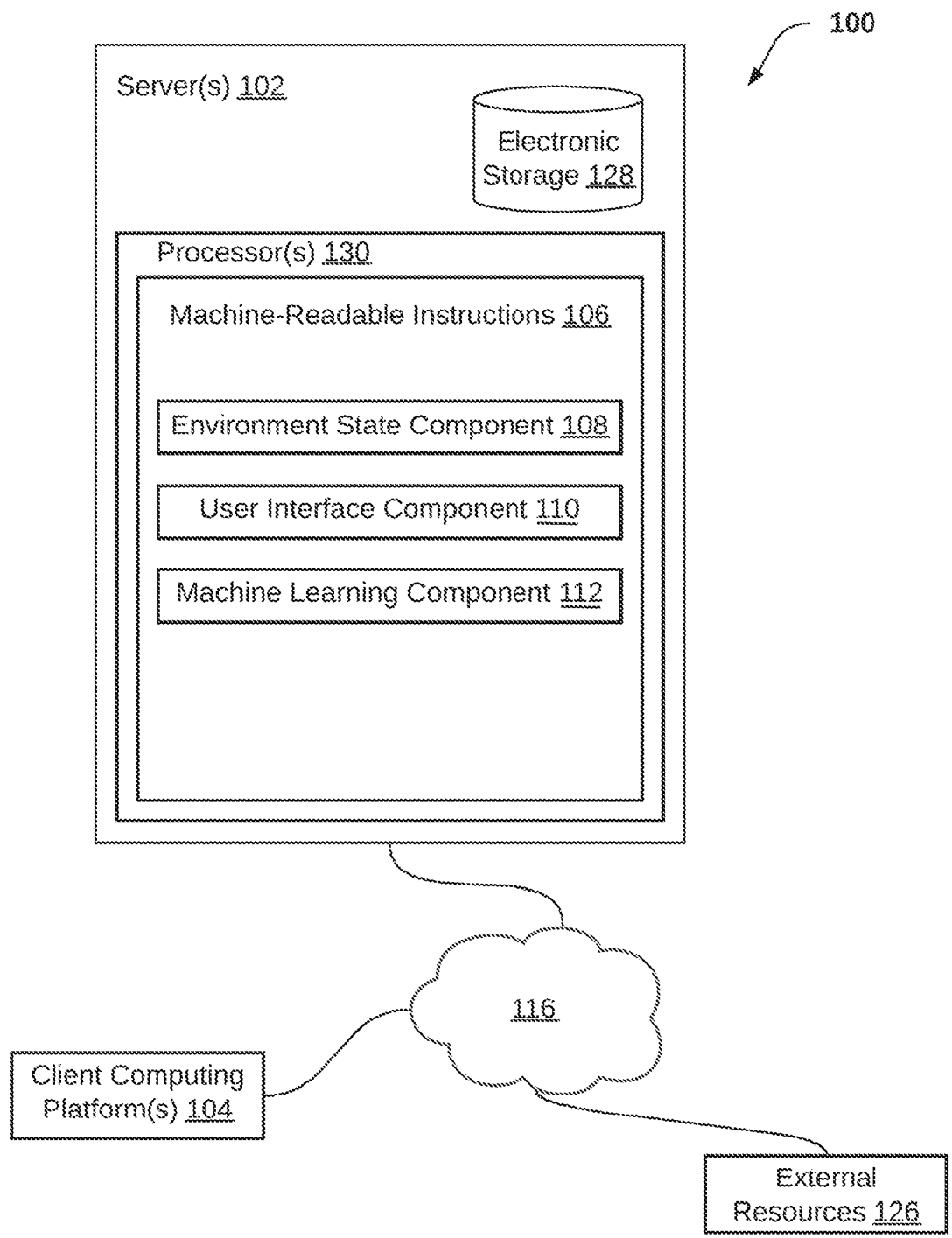
FIG. 1 illustrates a system configured to generate correspondences between portions of recorded audio content and records of a collaboration environment, in accordance with one or more implementations.

FIG. 1 illustrates a system 100 configured to generate correspondences between portions of recorded content and records of a collaboration environment, in accordance with one or more implementations. Correspondences may be associated with individual records so that users accessing the records through one or more user interfaces of the collaboration environment may be able to quickly jump to the portion(s) of the recorded content that are relevant to the particular work they are participating in. At least some of the correspondences may be user-provided via a specially configured and dedicated user interface.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to generate correspondences between portions of recorded content and records of a collaboration environment. The computer program components may include one or more of an environment state component 108, user interface component 110, a machine learning component 112, and/or other components.

Environment state component 108 may be configured to manage environment state information and/or other information used in maintaining a collaboration environment. The collaboration environment may be configured to facilitate interaction by users with the collaboration environment and/or each other. The environment state information may include one or more records. The one or more records may include one or more of user records, work unit records, project records, objective records, and/or other records. The user records may include user information describing the users of the collaboration environment. The work unit records which may include work information describing units of work assigned, created, and/or managed by the users within the collaboration environment. The project records may include project information describing projects created, assigned, and/or managed within the collaboration environment. An individual project may be associated with individual sets of the units of work supporting the individual projects. The objective records may include objective information describing business objectives specified within the collaboration environment.

The user information in the user records may include values of user parameters and/or other information. The values of the user parameters may be organized in the user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, and/or other information.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by the given user and assigned to one or more other users. Individual units of work may include one or more of an individual task, an individual sub-task, and/or other units of work assigned to and/or associated with one or more users. Individual units of work may include one or more digital assets. An individual unit of work may include an individual digital asset by virtue of the individual digital asset (and/or a copy or instance thereof) being attached and/or appended thereto. A digital asset may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the one or more work unit parameters may include one or more of a work assignment parameter, work completion parameter, a work management parameter, work creation parameter, dependency parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

In some implementations, values of work unit parameters may include one or more of a unit of work name, a unit of work description, user role information, one or more unit of work dates (e.g., a start date, a due date or end date, a completion date, and/or dates), project inclusion (e.g., identification of projects supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency, one or more custom fields (e.g., priority, cost, stage, and/or other custom fields), and/or other information.

The values of the work assignment parameter describing assignment of users to units of work may be determined based on one or more interactions by one or more users with a collaboration environment. In some implementations, one or more users may create and/or assign one or more units of work to themselves and/or another user. In some implementations, a user may be assigned a unit of work and the user may effectuate a reassignment of the unit of work from the user or one or more other users.

In some implementations, values of the work completion parameter may indicate that a completion status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects managed within the collaboration environment. The project parameters may characterize one or more projects created, assigned, and/or managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may be associated with one or more units of work assigned to one or more users under the given project heading. In some implementations, projects may be associated with one or more units of work that may directly facilitate progress toward fulfillment of the projects. Accordingly, completion of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work within individual ones of the projects (which may include values of work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, projects created by, assigned to, and/or completed by the users may refer generally to a linking of the projects with the individual users in the collaboration environment. A project may be linked with a user in a manner that defines one or more relationships between the user and the project. Such a relationship may connote and/or be a result of an action (past, present, and/or future) of the user with respect to the project. Such actions may include one or more of creating a project record for a project, being assigned to participate in a project, participating in a project, being granted access to a project record of a project, adjusting a value of a project parameter of a project record of a project, being assigned a project-level role, and/or other actions.

User role information may specify individual roles of the individual users. A role may represent a position of an individual user. The position may be specified based on a description of one or more of a job title, level, stage, and/or other descriptions of position. The role may be specified with respect to a business organization as a whole and/or other specifications. By way of non-limiting illustration, a role may include one or more of chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within the units of work and/or the projects. The roles may convey expected contribution of the users in completing and/or supporting the units of work and/or the projects. The individual roles of individual users within the units of work may be specified separately from the individual roles of the individual users within the projects. The individual roles of individual users within the units of work and/or projects may be specified separately from the individual roles of the individual users within a business organization as a whole.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and/or identify sets of work unit records and/or project records that support the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

Progress information for the individual business objectives may convey progress toward fulfillment of the individual business objectives. The progress information for the individual business objectives may convey progress toward fulfillment of the individual business objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual business objectives may be determined independently from incremental completion of the units of work in the individual sets of units of work associated with the individual business objectives. The completion of the units of work associated with a given business objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

It is noted that metadata and/or values of parameters related to users, projects, business objectives, and/or units of work may be considered values of user parameters, project parameters, objective parameters, and/or work unit parameters.

In some implementations, environment state component 108 may be configured to manage information defining pages corresponding to the individual records. The individual pages may provide access to the individual records. By way of non-limiting illustration, work unit pages may provide access to work unit records; project pages may provide access to project records; objective pages may provide access to objective records. Managing information defining pages may include determining, obtaining, and/or modifying information used to generate pages. Managing information defining individual pages may include providing information to the user interface component 110 to effectuate presentation of the pages, and/or other information. In some implementations, individual pages may include individual sets of interface elements displaying the values of one or more of the parameters of the individual records. In some implementations, access to records via pages may include one or more of viewing information in the records, changing information in the records, deleting information in the records, adding information in the records, and/or other actions.

User interface component 110 may be configured to effectuate presentation of instances of a user interface on client computing platform(s) 104 associated with the users. The users may upload recorded content, access recorded content, and/or provide user input through the instances of the user interface to generate user-provided correspondences between temporal content of the recorded content and one or more records.

In some implementations, recorded content may include utterances by one or more of users and/or other sounds. The user utterances included in recorded content may include speech, emotes, and/or other vocalizations. An individual utterance may include one or more of a spoken word, a statement, a vocal sound, and/or other considerations. Other sounds may include environmental noise and/or other sounds.

In some implementations, recorded audio content may be included in and/or extracted from recorded video content (i.e., meetings, presentations, tutorials, etc.), and/or other types of content. The recorded video content may include visual content. The visual content may include one or more of individual images comprising frames of a video, sets of images comprising a series of frames, and/or other content. The recorded video content may depict one or more of real-world users, real-world environment, digital content, and/or other content. In some implementations, recorded video content may include time stamps associated with the recorded visual content and recorded audio content. The time stamps may provide a synchronization between the recorded visual content and recorded audio content. In some implementations, the temporal content of recorded content may include the time stamps associated with a combination of recorded audio content and recorded visual content.

The user interface may include one or more portions. Individual portions may include one or more user interface elements configured to facilitate user interaction with the user interface. By way of non-limiting illustration, user interface elements may include one or more of text input field, drop-down menus, check boxes, display windows, virtual buttons, slide bars, and/or other elements configured to facilitate user interaction. The portion(s) may include one or more of an input portion, a playback portion, temporal selection portion, record identification portion, and/or other portions.

In some implementations, the input portion may be configured to receive user input of digital assets defining recorded content. Digital assets may include one or more video files, audio files, text files, and/or other digital assets that define the recorded content. In some implementations, the input portion may be configured to receive user input through drag-and-drop input, file selection through a search and/or drop-down menu, and/or other input. In some implementations, the input portion may be configured to receive user input to identify recorded content already uploaded within system 100. By way of non-limiting illustration, for identifying existing recorded content, users may select a digital asset from a drop-down menu and/or identify the digital asset by name via a text input field.

The playback portion may be configured to facilitate viewing, listening, and/or other playback of recorded content. The playback portion may be configured to receive user input including identification of temporal content within the recorded content and/or other input. The playback portion may include one or more of a playback window, a temporal selection portion, and/or other elements. The playback window may be a dedicated element of the playback portion through which playback of the recorded audio is presented. For recorded audio, the playback window may display a waveform of the audio while audio is played via speakers, and/or other graphics. For recorded video, the playback window may display a visual playback of visual content.

The temporal selection portion may be configured to received user input to direct the recorded content to one or more points in time. By way of non-limiting illustration, the temporal selection portion may include a slide bar, one or more sliding elements, and/or other interface element(s). The user may interact with elements of the temporal selection portion to direct the recorded content to one or more points in time. The slide bar may represent a duration of the recorded content. A user may translate a sliding element within the slide bar to a relative position within the slide bar representing a point in time within the duration. Multiple sliding elements may be provided so that the users may identify a period in time represented by a spacing between the multiple sliding elements. For example, a first sliding element may be positioned to identify a start of the period of time, and a second sliding element may be positioned to identify an end of the period of time. A user may provide input to save and/or timestamp the one or more points in time identified by their interaction with the temporal content portion. A user may provide input to save and/or timestamp a section of the recorded content between multiple points in time to specify a period of time within the recorded content. The input may be facilitated, for example, by selecting a virtual button and/or other input which confirms their selection via the temporal selection portion.

In some implementations, the record identification portion may be configured to receive user input to identify individual records that correspond to identified temporal content. In some implementations, record identification portion may be provided where a user can select and/or input a particular record (e.g., by title and/or other identifying information) to associate with the points in time and/or periods in time thereby specifying a user-provided correspondence. In some implementations, the record identification portion may be presented to the user after, before, and/or during the user's identification of temporal content for the correspondences. The record identification portion may be configured to receive user input through a search and/or drop-down menu, and/or other input. By way of non-limiting illustration, for identifying existing records, users may select a record from a drop-down menu and/or identify the record by name via a text input field. In some implementations, the user interface may be accessed through a page of a record. In such implementation, a subsequently identified temporal content may be pre-associated with that record since the page for that record was the source from which the user interface was accessed.

In some implementations, the record identification portion may be configured to recommended one or more records. The records may be recommended based on the records being associated with the user (e.g., being assigned to the user, including the user as a collaborator, etc.), related to other work associated with the user, and/or other considerations. By way of non-limiting illustration, a user may have identified temporal content within recorded content and have provided a correspondence with a work unit record that is part of a project. The user may then provide additional identification of temporal content within the recorded content. An other work unit record, that is also part of the project, may be recommended for the additionally identified temporal content. Recommendations may be determined in other ways.

In some implementations, the record identification portion may be configured to receive user input to generate one or more new records for the correspondences. The record identification portion may include blank page for a record through which a user provides inputs. The record identification may include one or more input fields (e.g., text input fields, selection menus) for values of parameters (e.g., assignee, collaborators, action items, objectives, etc.) to define the new records. The user input may identify the newly generated record as corresponding to identified ones of the temporal content within the recorded content.

By way of non-limiting illustration, a first instance of the user interface may be presented on a first client computing platform associated with a first user through which the first user accesses first recorded audio content and/or provides a first set of user input. The first set of user input may include an identification of first temporal content within the first recorded audio content and/or an identification of second temporal content within the first recorded audio content. The first set of user input may further include identification of the first work unit record as corresponding to the first temporal content, and/or identification of the second work unit record as corresponding to the second temporal content.

In some implementations, presentation of the instances of the user interface through which the users access the recorded content may be limited to the users that are linked to the recorded content. The users that are linked to the recorded content may include one or more of creators of the recorded content, assignees of individual ones of the records created from the recorded content, one or more of the users who participated in the recorded content, and/or other users. Access to the recorded content may allow the users to view, edit, and/or otherwise interact with the recorded content. In some implementations, permissions defining user access to the recorded content may be stored in records for work linked to the recorded content.

Environment state component 108 may be configured to obtain user input information and/or other information. The user input information may convey the user input into the instances of the user interface. In some implementation, user input information may include one or more of inputting digital assets defining recorded content, identifying recorded content, identifying temporal content of the recorded content, identifying one or more records, creating one or more new records, identifying correspondences between the temporal content and one or more records, and/or other input.

Environment state component 108 may be configured to generate, based on the user input information, correspondence information. The correspondence information may convey user-provided correspondences between the temporal content of recorded content and one or more records. In some implementations, a correspondence between temporal content of recorded content and a record may indicate the record was generated (i.e., created) based on, and/or is relevant to, the temporal content. The correspondence may indicate the temporal content of the recorded content includes information pertaining and/or relevant to the record, and/or indicate other relationships between the temporal content of the recorded content and the record.

By way of non-limiting illustration, environment state component 108 may be configured to, based on the first set of user input, generate one or more of first correspondence information, second correspondence information, and/or other information. The first correspondence information may convey a first correspondence between the first temporal content of the first recorded audio content and the first work unit record and/or other records. The second correspondence information may convey a second correspondence between second temporal content of the first recorded audio content and the second work unit record and/or other records.

Environment state component 108 may be configured to store the correspondence information and/or other information in the records. Environment state component 108 may be configured to store resource information and/or other information in the records. The resource information may include, and/or may provide access to, digital assets defining the recorded content. The resource information may include copies of the digital assets. The resource information may include links (e.g., pointers, hyperlinks, etc.) to the temporal content in the recorded content. In some implementations, the resource information may include clips or portions of the recorded content that comprise the temporal content separated from the recorded content as a whole.

In some implementations, storing correspondence information and/or resource information in the individual records may cause individual resource identifiers to be presented in individual pages of the individual records. A resource identifier may include a link and/or other interface element. A resource identifier may be selected to cause presentation of temporal content of recorded content. By way of non-limiting illustration, selection of a resource identifier within a page may identify a record and/or may access a digital asset stored in the record by virtue of a correspondence between the digital asset and the record.

In some implementations, user interface component 110 may be configured to monitor the user interaction with the temporal selection portion and/or other portions of the user interface. User interface component 110 may be further configured to identify and/or store indications of the one or more of the points in time and/or the one or more periods of time within the correspondence information.

In some implementations, user interface component 110 may be configured to effectuate presentation of pages of the collaboration environment through which the users access the records. The pages may include and/or provide access to the recorded content and/or the temporal content. Access to the recorded content and/or temporal content may allow the user to view and/or interact with the recorded audio content and/or temporal content. The pages may include and/or provide access to the recorded content to generate user-provided correspondences. Access to the recorded audio content and/or the temporal content may be facilitated by resource identifiers appearing on the pages. Users may be capable of interacting with resource identifiers. For example, user selection of a resource identifier identifies a record and accesses a digital asset (e.g., video files, audio files, text files, and/or other digital assets) stored in the record. Accessing a digital asset may allow a user to view and/or otherwise interact with the digital asset.

Machine learning component 112 may be configured to compile the user-provided correspondence information and information from one or more records into input/output pairs to train a machine learning model. The information from the one or more records may include one or more of title, description, assignee, assignor, creator, due date, start date, and/or other information (e.g., values of one or more parameters). The training of the machine learning model may adapt the model to learn the type of intuition that users use when specifying correspondences themselves. Accordingly, as users continue to provide more correspondences, the more the machine learning model is able to learn. Further, the results of using the trained machine learning model to generate correspondences, with or without correction/adjustments by users to refine the model, may be fed back into the trained model to further refine it.

In some implementations, input/output pairs may include training input information, training output information, and/or other information. The training input information for an individual input/output pair may include the user-provided correspondence information for an individual record and temporal content within an individual recorded content. The training output information for the individual input/output pair may include information from the individual record. By way of non-limiting illustration, the first correspondence information and the work information for the first work unit record may be compiled into a first input/output pair. The second correspondence information and the work information for the second work unit record may be compiled into a second input/output pair. The quantity of training input data may be indicated based on the participation of users to provide user-provided correspondences. Further, as will be described in more detail herein, the output produced by the trained machine learning including automatically generated correspondences may be confirmed and/or corrected by users to further refine the model.

Machine learning component 112 may be configured to train the machine learning model based on the input/output pairs to generate a trained machine learning model. The trained machine learning model may thereafter be configured to automatically generate correspondences between temporal content of recorded content and one or more records not yet having correspondences. By way of non-limiting illustration, the machine learning model may be trained using the first input/output pair, the second input/output pair, and/or other input/output pairs to generate the trained machine learning model.

In some implementations, the machine learning model may utilize one or more of an artificial neural network, naïve Bayes classifier algorithm, k-means clustering algorithm, support vector machine algorithm, linear regression, logistic regression, decision trees, random forest, nearest neighbors, and/or other approaches. Machine learning component 112 may utilize training techniques such as supervised learning, semi-supervised learning, unsupervised learning, reinforcement learning, and/or other techniques.

In supervised learning, the model may be provided with known training dataset that includes desired inputs and outputs (e.g., the input/output pairs described herein), and the model may be configured to find a method to determine how to arrive at those outputs based on the inputs. The model may identify patterns in data, learn from observations, and make predictions. The model may make predictions and may be corrected by an operator—this process may continue until the model achieves a high level of accuracy/performance. Supervised learning may utilize approaches including one or more of classification, regression, and/or forecasting.

Semi-supervised learning may be similar to supervised learning, but instead uses both labelled and unlabeled data. Labelled data may comprise information that has meaningful tags so that the model can understand the data (e.g., the input/output pairs described herein), while unlabeled data may lack that information. By using this combination, the machine learning model may learn to label unlabeled data.

Machine learning component 112 may be configured to store the trained machine learning model. In some implementations, the trained machine learning model may be stored in electronic storage 128.

Given the machine learning model has been trained to generated correspondences between portions of recorded content and records, system 100 may be configured to use the trained machine learning model. For example, recorded content may be input into the trained machine learning model along with existing records that were generated from the recorded content (either by users manually or by automation) but not yet having correspondences. In some implementations, users may upload new digital assets representing recorded content as input. The recorded content may be provided in combination with records as input to the trained machine learning model to generate correspondences as output.

In some implementations, machine learning component 112 may be configured to determine the correspondence information from user input into a user interface. In some implementation, machine learning component 112 may determine a correspondence between temporal content of recorded content of an uploaded digital asset and one or more records.

The machine learning component 112 may be configured to obtain the output from the trained machine learning model. The output may include automatically generated correspondence information and/or other information.

The machine learning component 112 may be configured to store the automatically generated correspondence information in the records. In some implementations, the stored correspondence information may facilitate access to the temporal content of the recorded content (i.e., by identifying points in time and/or periods of time within the recorded content) through pages of the records. In some implementations, during playback of recorded content, a user interface may be configured to receive user input to correct and/or confirm the automatically generated correspondence information. By way of non-limiting illustration, upon presentation of temporal content of recorded content, a user may notice that there may be more content within a recording that would be helpful to understand their work at hand. The user may be able to provide input to expand the temporal content to include more portions of the recorded content. Further, upon presentation of temporal content of recorded content, a user may notice that the temporal content includes unnecessary portions of the recorded content. The user may be able to provide input to shorten the temporal content to include a shorter period of time within the recorded content.

In some implementations, environment state information may be updated as users continue to interact with the collaboration environment via the user interfaces over time. The environment state component 108 may store and/or archive the environment state information periodically and/or based on user request to archive. In some implementations, the environment state component 108 may store historical environment state information specifying historical user information, historical work information, historical project information, historical objective information, user interaction history, and/or other information.

Figure 4:
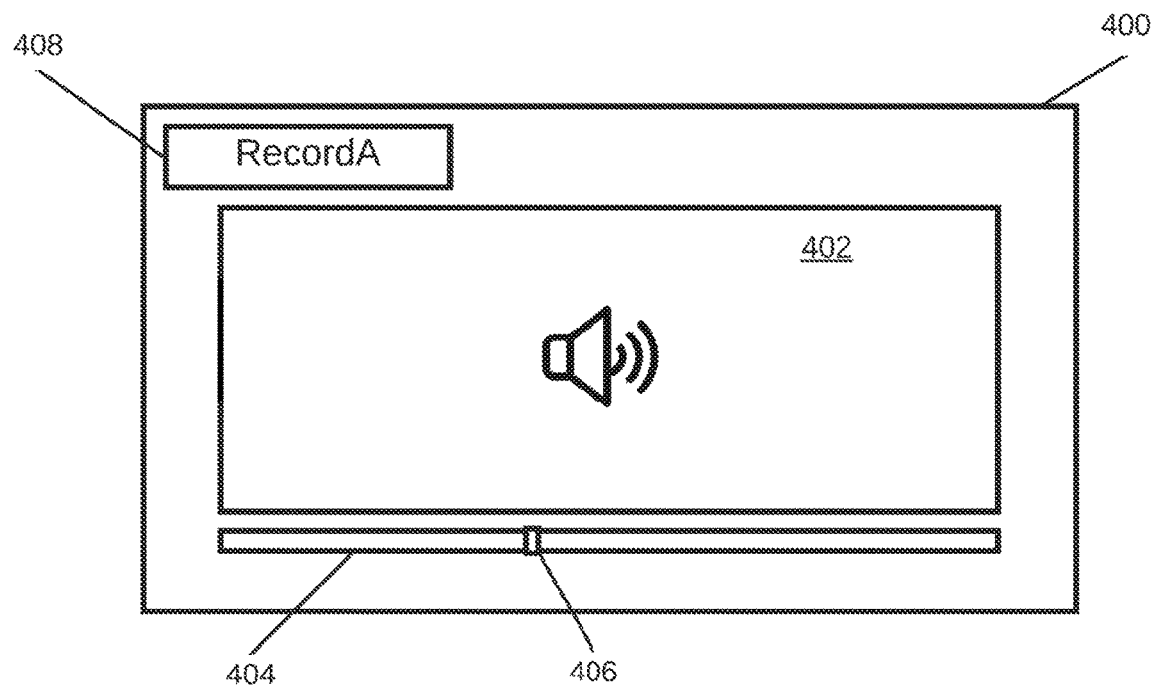
FIG. 4 illustrates a user interface, in accordance with one or more implementations.

FIG. 4 illustrates a user interface 400, in accordance with one or more implementations. The users may access recorded content and/or provide user input through instances of the user interface 400. The user interface 400 may include one or more portions. A playback portion may include playback window 402 through which a user may view and/or listen to recorded content. For illustrative purposes, the recorded content may be audio content such that the playback window 402 may display some graphic during playback of the audio via speakers (not shown). The playback portion may be configured to receive user input which may include identification of the temporal content for the correspondences. The playback portion may include a temporal selection portion 404 (e.g., slide bar and/or other interface element(s)) to direct the recorded content to one or more points in time. The temporal selection portion 404 may include one or more sliding elements, such as sliding element 406, for selecting one or more points in time. A user may provide input to save and/or timestamp one or more points in time, for example, through selection of a virtual button (not shown). A user may input to save and/or timestamp a section of the recorded content between multiple points in time to specify a period of time within the recorded content. A record identification portion 408 may be provided where a user can select and/or input a particular record (e.g., by title and/or other identifying information) to associate with the point in time and/or period in time thereby specifying a user-provided correspondence.

Figure 5:
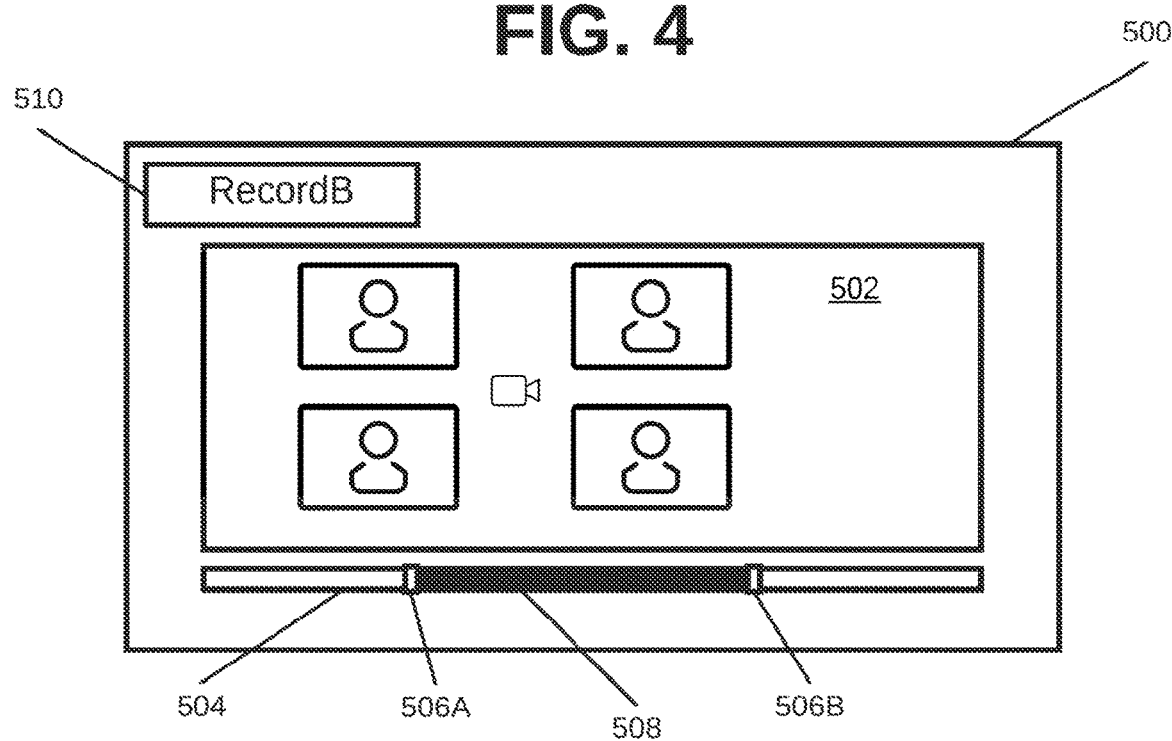
FIG. 5 illustrates a user interface, in accordance with one or more implementations.

FIG. 5 illustrates a user interface 500, in accordance with one or more implementations. The users may access recorded content and/or provide user input through instances of the user interface 500. The user interface 500 may include one or more portions. A playback portion may include a playback window 502 through which a user may view and/or listen to recorded content. For illustrative purposes, the recorded content may be video content such that the playback window 502 may display visual content (e.g., a recorded virtual meeting) in synchronization with playback of audio via speakers (not shown). The playback portion may be configured to receive user input which may include identification of the temporal content for the correspondences. The playback portion may include a temporal selection portion 504 (e.g., slide bar and/or other interface element(s)) to direct the recorded content to one or more points in time. The temporal selection portion 504 may include one or more slide elements, such as elements 506a and 506b, for selecting one or more points in time. Indicator 506a may characterize a start point for temporal content 508. Indicator 506b may characterize an end point for temporal content 508. A user may provide input to save and/or timestamp one or more points in time, for example, through selection of a virtual button (not shown). A user may input to save and/or timestamp a section of the recorded content between multiple points in time to specify a period of time within the recorded content. A record identification portion 510 may be provided where a user can select and/or input a particular record (e.g., by title and/or other identifying information) to associate with the point in time and/or period in time thereby specifying a user-provided correspondence.

Figure 6:
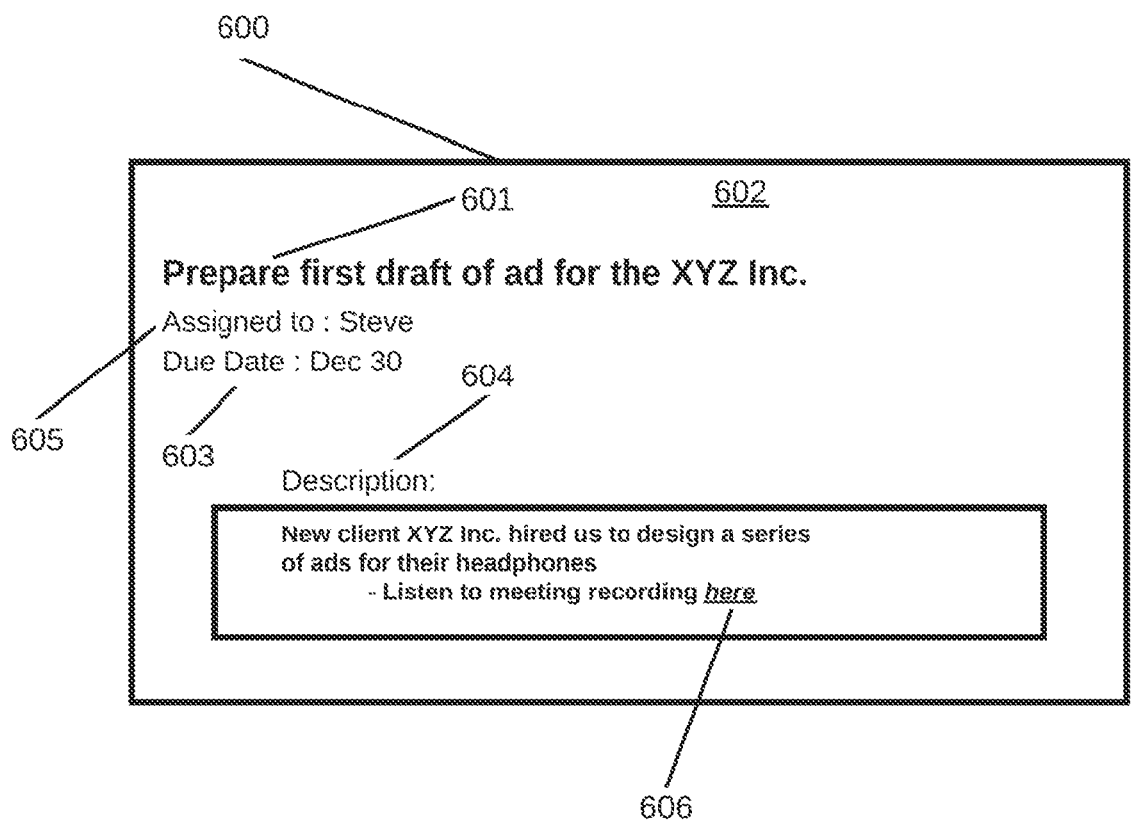
FIG. 6 illustrates a user interface, in accordance with one or more implementations.

FIG. 6 illustrates a user interface 600 of a collaboration environment, in accordance with one or more implementations. The user interface 600 may include a view of a collaboration environment. In particular, the user interface 600 may comprise a work unit page 602 for a unit of work. The user interface 600 may display values of one or more work unit parameters, and/or other information. By way of non-limiting illustration, a user interface element 601 may display a title of the unit of work. A user interface element 603 may display a due date of the unit of work. A user interface element 605 may display an assignee of the unit of work. A user interface element 604 may display a description of the unit of work. The work unit page 602 may include a link 606 to a digital asset associated with the unit of work by virtue of a user-provided correspondence (or, in some instances, an automatically generated one), which may be stored in a work unit record. Selection of the link 606 may cause presentation of recorded content defined by the digital asset. Selection of the link 606 may cause presentation of temporal content within the recorded content that specifically corresponds to the unit of work. A playback window, the same as or similar to FIG. 3 and/or FIG. 4, may be displayed to present the temporal content.

Referring back to FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
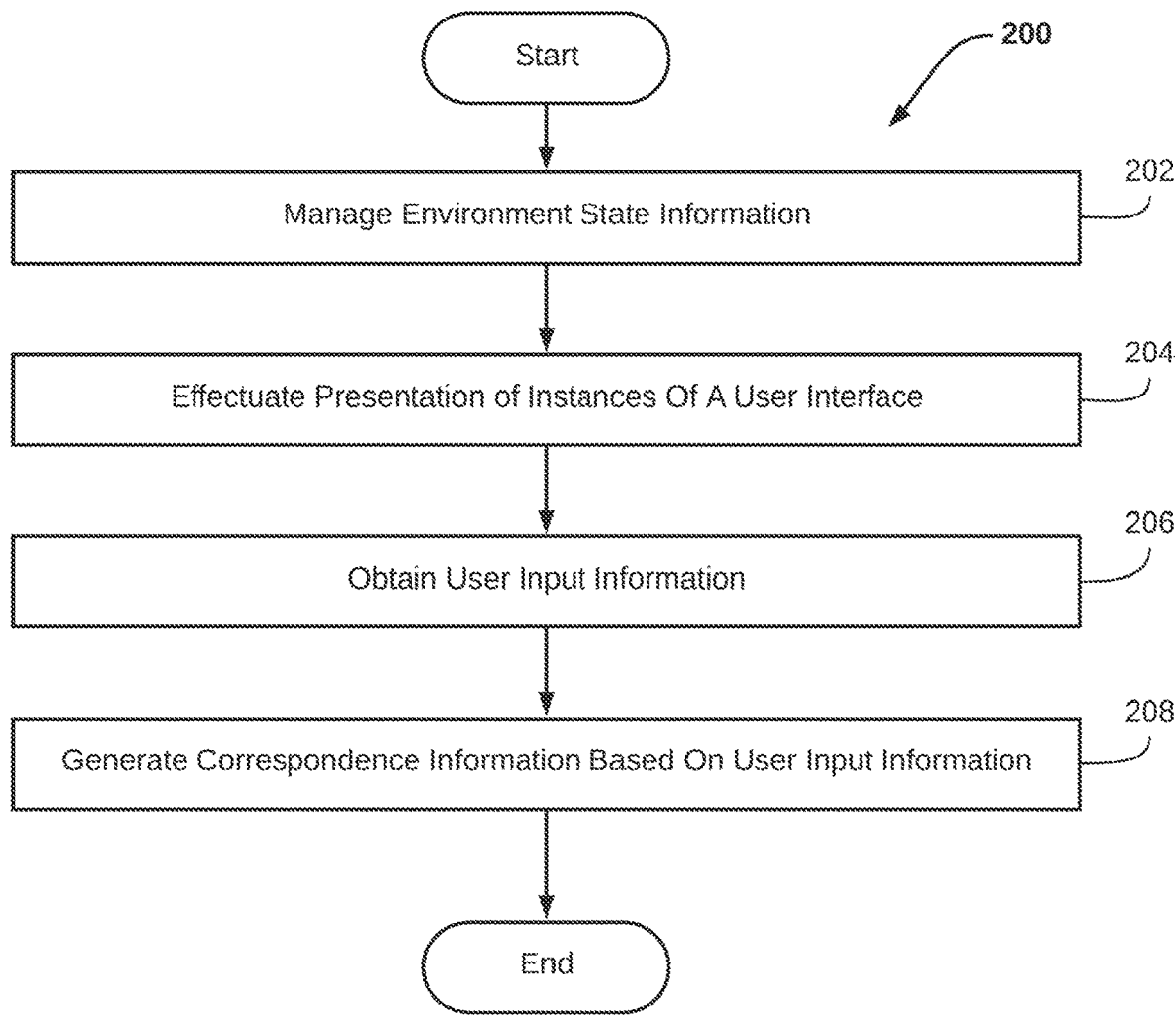
FIG. 2 illustrates a method to generate correspondences between portions of recorded content and records of a collaboration environment, in accordance with one or more implementations.

FIG. 2 illustrates a method 200 to generate correspondences between portions of recorded audio content and records of a collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include one or more records. The one or more records may include work unit records and/or other records. The work unit records may include work information and/or other information. The work information may characterize units of work created, managed, and/or assigned to within the collaboration environment to the users who are expected to accomplish one or more actions to complete the units of work. The work information may comprise values of work unit parameters. The work unit records may include a first work unit record for a first unit of work and a second work unit record for a second unit of work. Operation 202 may be performed by one or more hardware processors configured by machine-readable instructions including a component that is the same as or similar to environment state component 108, in accordance with one or more implementations.

An operation 204 may effectuate presentation of instances of a user interface on client computing platform(s) associated with the users. The users may access recorded content and/or provide user input through the instances of the user interface to generate user-provided correspondences between temporal content of the recorded content and one or more of the records. The recorded content may include utterances by one or more of the users. The temporal content may correspond to points in time and/or periods of time within the recorded content. The user input may include identification of the temporal content within the recorded content. A first instance of the user interface may be presented on a first client computing platform associated with a first user through which the first user accesses first recorded content and provides a first set of user input. The first set of user input may include an identification of first temporal content within the first recorded content, an identification of second temporal content within the first recorded content, and/or other input. Operation 204 may be performed by one or more hardware processors configured by machine-readable instructions including a component that is the same as or similar to user interface component 110, in accordance with one or more implementations.

An operation 206 may obtain user input information conveying the user input into the instances of the user interface. First user input information may convey the first set of user input into the first instance of the user interface. Operation 206 may be performed by one or more hardware processors configured by machine-readable instructions including a component that is the same as or similar to environment state component 108, in accordance with one or more implementations.

An operation 208 may generate, based on the user input information, correspondence information. Correspondence information may convey the user-provided correspondences between the temporal content of the recorded audio content and the one or more of the work unit records. Based on the first set of user input, first correspondence information and second correspondence information may be generated. The first correspondence information may convey a first correspondence between the first temporal content of the first recorded audio content and the first work unit record is generated, and the second correspondence information may convey a second correspondence between the second temporal content of the first recorded audio content and the second work unit record is generated. Operation 208 may be performed by one or more hardware processors configured by machine-readable instructions including a component that is the same as or similar to environment state component 108, in accordance with one or more implementations.

Figure 3:
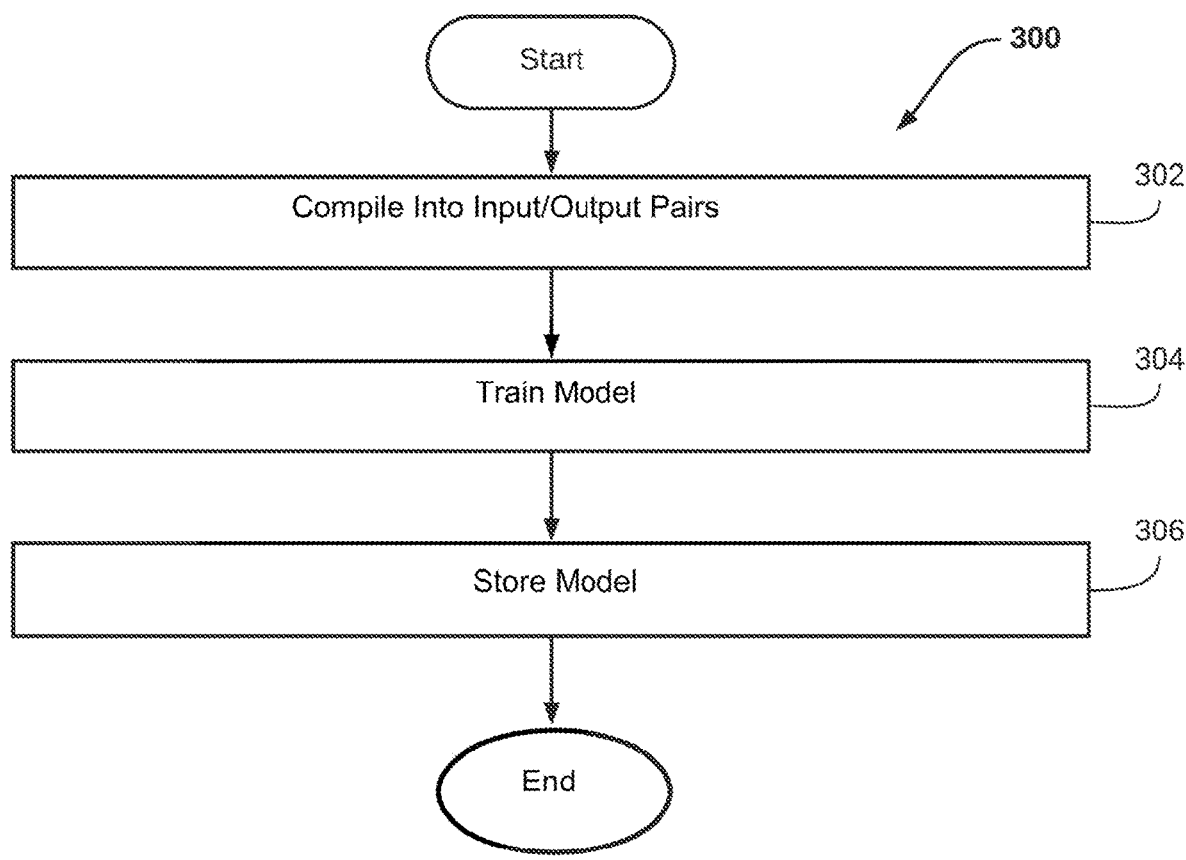
FIG. 3 illustrates a method to train a machine learning model to generate correspondences between portions of recorded content and records of a collaboration environment, in accordance with one or more implementations.

FIG. 3 illustrates a method 300 to train a machine learning model to generate correspondences between portions of recorded content and records of a collaboration environment. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

An operation 302 may compile correspondence information and information from records into input/output pairs. The input/output pairs may comprise training input information and training output information to train a machine learning model. The training input information for an individual input/output pair may include correspondence information for an individual recorded content and individual record, and the training output information for the individual input/output pair including the information from the individual record. Operation 302 may be performed by one or more hardware processors configured by machine-readable instructions including a component that is the same as or similar to machine learning component 112, in accordance with one or more implementations.

An operation 304 may train a machine learning model based on the input/output pairs to generate a trained machine learning model. The trained machine learning model being configured to automatically generate correspondences between the temporal content of the recorded content and the records. By way of non-limiting illustration, the machine learning model may be trained using one or more of the first input/output pair, the second input/output pair, and/or other information to generate the trained machine learning model.

Operation 304 may be performed by one or more hardware processors configured by machine-readable instructions including a component that is the same as or similar to machine learning component 112, in accordance with one or more implementations.

An operation 306 may store the trained machine learning model. Operation 306 may be performed by one or more hardware processors configured by machine-readable instructions including a component that is the same as or similar to machine learning component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate correspondences between portions of recorded audio content and records of a collaboration environment, the system comprising:
   one or more physical processors configured by machine-readable instructions to:
      manage environment state information maintaining a collaboration environment, the collaboration environment being configured to facilitate interaction by users with the collaboration environment, the environment state information including work unit records, the work unit records including work information characterizing units of work created within the collaboration environment and assigned within the collaboration environment to the users who are expected to accomplish one or more actions to complete the units of work, the work unit records including a first work unit record for a first unit of work previously assigned to a first user to complete, and a second work unit record for a second unit of work;
      effectuate presentation of instances of a user interface on client computing platform associated with the users, wherein the users access recorded audio content and provide user input through the instances of the user interface to generate user-provided correspondences between temporal content of the recorded audio content and one or more of the work unit records, the recorded audio content including utterances by one or more of the users, the temporal content corresponding to periods of time within the recorded audio content, the user input including identification of the temporal content within the recorded audio content, such that a first instance of the user interface is presented on a first client computing platform associated with the first user through which the first user accesses first recorded audio content and provides a first set of user inputs, the first set of user inputs including an identification of first temporal content within the first recorded audio content and an identification of second temporal content within the first recorded audio content, wherein the user interface includes a temporal selection portion, and wherein the user input further includes user interaction with the temporal selection portion to direct a playback of the recorded audio content to individual ones of the periods of time to identify the temporal content;
      obtain user input information conveying the user input into the instances of the user interface, such that first user input information conveys the first set of user inputs into the first instance of the user interface by the first user;
      generate, based on the user input information, correspondence information conveying the user-provided correspondences between the temporal content of the recorded audio content and the one or more of the work unit records so that the users accessing the one or more of the work unit records are also provided access to corresponding ones of the recorded audio content and/or the temporal content, such that based on the first set of user inputs by the first user previously assigned to the first unit of work, first correspondence information and second correspondence information are generated, the first correspondence information conveying a first correspondence between the first temporal content of the first recorded audio content and the first work unit record, and the second correspondence information conveying a second correspondence between the second temporal content of the first recorded audio content and the second work unit record, such that access to the first temporal content of the first recorded audio content is provided while accessing the first work unit record, and access to the second temporal content of the first recorded audio content is provided while accessing the second work unit record;
      monitor the first set of user inputs with the temporal selection portion displayed in the first instance of the user interface that leads to updated indications of position and duration of a first period of time that identifies the first temporal content within the first recorded audio content;
      identify and store the updated indications within the first correspondence information; and
      effectuate presentation of work unit pages of the collaboration environment through which the users access the work unit records, the work unit pages displaying work descriptions of respective work or user descriptions of respective users to whom the respective work is assigned, the work unit pages providing access, in response to further user input, to the instances of the user interface through which the users access the recorded audio content and/or the temporal content to provide the user input, such that a first work unit page is presented on the first client computing platform of the first user through which the first user accesses the first work unit record, the first work unit page providing the access to the first instance of the user interface through which the first user accesses the first recorded audio content and/or the first temporal content to provide the first set of user inputs.

2. The system of claim 1, wherein the user input further includes identification of individual work unit records that correspond to identified ones of the temporal content within the recorded audio content, such that the first set of user inputs further includes identification of the first work unit record as corresponding to the first temporal content, and identification of the second work unit record as corresponding to the second temporal content.

3. The system of claim 1, wherein the presentation of the instances of the user interface through which the users access the recorded audio content is limited to the users that are linked to the recorded audio content.

4. The system of claim 3, wherein the users that are linked to the recorded audio content include one or more of creators of the recorded audio content, assignees of individual ones of the work unit records, or one or more of the users who participated in the recorded audio content.

5. The system of claim 1, wherein the one or more physical processors are further configured by the machine-readable instructions to:
   store the correspondence information in the work unit records, such that the first correspondence information is stored in the first work unit record, and the second correspondence information is stored in the second work unit record.

6. The system of claim 1, wherein the access to the recorded audio content and/or the temporal content is facilitated by resource identifiers appearing on the work unit pages, such that selection of a resource identifier identifies a work unit record and accesses a digital asset stored in the work unit record.

7. The system of claim 1, wherein the one or more physical processors are further configured by the machine-readable instructions to:
   compile the correspondence information and the work information of the one or more of the work unit records into input/output pairs, the input/output pairs including training input information and training output information, the training input information for an individual input/output pair including the correspondence information for an individual one of the recorded audio content, the training output information for the individual input/output pair including the work information for an individual one of the work unit records, such that the first correspondence information and the work information for the first work unit record are compiled into a first input/output pair, and the second correspondence information and the work information for the second work unit record are compiled into a second input/output pair;
      train a machine learning model based on the input/output pairs to generate a trained machine learning model, the trained machine learning model being configured to generate the correspondences between the temporal content of the recorded audio content and the work unit records, such that the machine learning model is trained using the first input/output pair and the second input/output pair to generate the trained machine learning model; and
      store the trained machine learning model.

8. A method to generate correspondences between portions of recorded audio content and records of a collaboration environment, the method comprising:
   managing environment state information maintaining a collaboration environment, the collaboration environment being configured to facilitate interaction by users with the collaboration environment, the environment state information including work unit records, the work unit records including work information characterizing units of work created within the collaboration environment and assigned within the collaboration environment to the users who are expected to accomplish one or more actions to complete the units of work, the work unit records including a first work unit record for a first unit of work previously assigned to a first user to complete, and a second work unit record for a second unit of work;
   effectuating presentation of instances of a user interface on client computing platform associated with the users, wherein the users access recorded audio content and provide user input through the instances of the user interface to generate user-provided correspondences between temporal content of the recorded audio content and one or more of the work unit records, the recorded audio content including utterances by one or more of the users, the temporal content corresponding to periods of time within the recorded audio content, the user input including identification of the temporal content within the recorded audio content, including presenting a first instance of the user interface on a first client computing platform associated with the first user through which the first user accesses first recorded audio content and provides a first set of user inputs, the first set of user inputs including an identification of first temporal content within the first recorded audio content and an identification of second temporal content within the first recorded audio content, wherein the user interface includes a temporal selection portion, and wherein the user input further includes user interaction with the temporal selection portion to direct a playback of the recorded audio content to individual ones of the periods of time to identify the temporal content;
   obtaining user input information conveying the user input into the instances of the user interface, including obtaining first user input information conveying the first set of user inputs into the first instance of the user interface by the first user;
   generating, based on the user input information, correspondence information conveying the user-provided correspondences between the temporal content of the recorded audio content and the one or more of the work unit records so that the users accessing the one or more of the work unit records are also provided access to corresponding ones of the recorded audio content and/or the temporal content, including based on the first set of user inputs by the first user previously assigned to the first unit of work, generating first correspondence information and second correspondence information, the first correspondence information conveying a first correspondence between the first temporal content of the first recorded audio content and the first work unit record, and the second correspondence information conveying a second correspondence between the second temporal content of the first recorded audio content and the second work unit record, such that access to the first temporal content of the first recorded audio content is provided while accessing the first work unit record, and access to the second temporal content of the first recorded audio content is provided while accessing the second work unit record;
   monitoring the first set of user inputs with the temporal selection portion displayed in the first instance of the user interface that leads to updated indications of position and duration of a first period of time that identifies the first temporal content within the first recorded audio content;
   identifying and storing the updated indications within the first correspondence information; and
   effectuating presentation of work unit pages of the collaboration environment through which the users access the work unit records, the work unit pages displaying work descriptions of respective work or user descriptions of respective users to whom the respective work is assigned, the work unit pages providing access, in response to further user input, to the instances of the user interface through which the users access the recorded audio content and/or the temporal content to provide the user input, such that a first work unit page is presented on the first client computing platform of the first user through which the first user accesses the first work unit record, the first work unit page providing the access to the first instance of the user interface through which the first user accesses the first recorded audio content and/or the first temporal content to provide the first set of user inputs.

9. The method of claim 8, wherein the user input further includes identification of individual work unit records that correspond to identified ones of the temporal content within the recorded audio content, such that the first set of user inputs further includes identification of the first work unit record as corresponding to the first temporal content, and identification of the second work unit record as corresponding to the second temporal content.

10. The method of claim 8, wherein the presentation of the instances of the user interface through which the users access the recorded audio content is limited to the users that are linked to the recorded audio content.

11. The method of claim 10, wherein the users that are linked to the recorded audio content include one or more of creators of the recorded audio content, assignees of individual ones of the work unit records, or one or more of the users who participated in the recorded audio content.

12. The method of claim 8, further comprising:
storing the correspondence information in the work unit records, such that the first correspondence information is stored in the first work unit record, and the second correspondence information is stored in the second work unit record.

13. The method of claim 8, wherein the access to the recorded audio content and/or the temporal content is facilitated by resource identifiers appearing on the work unit pages, such that selection of a resource identifier identifies a work unit record and accesses a digital asset stored in the work unit record.

14. The method of claim 8, further comprising:
compiling the correspondence information and the work information of the one or more of the work unit records into input/output pairs, the input/output pairs including training input information and training output information, the training input information for an individual input/output pair including the correspondence information for an individual one of the recorded audio content, the training output information for the individual input/output pair including the work information for an individual one of the work unit records, including compiling the first correspondence information and the work information for the first work unit record into a first input/output pair, and the second correspondence information and the work information for the second work unit record are compiled into a second input/output pair;

training a machine learning model based on the input/output pairs to generate a trained machine learning model, the trained machine learning model being configured to generate the correspondences between the temporal content of the recorded audio content and the work unit records, including training the machine learning model based on the first input/output pair and the second input/output pair to generate the trained machine learning model; and storing the trained machine learning model.

* * * * *